United States Patent
Zacharias et al.

(10) Patent No.: US 8,116,103 B2
(45) Date of Patent: Feb. 14, 2012

(54) DEVICE FOR FEEDING ELECTRIC ENERGY INTO A POWER GRID AND DC CONVERTER FOR SUCH A DEVICE

(75) Inventors: Peter Zacharias, Kassel (DE); Benjamin Sahan, Kassel (DE)

(73) Assignee: SMA Solar Technology AG, Niestetal (DE)

(*) Notice: Subject to any disclaimer, the term of this patent is extended or adjusted under 35 U.S.C. 154(b) by 62 days.

(21) Appl. No.: 12/309,425

(22) PCT Filed: Apr. 12, 2008

(86) PCT No.: PCT/DE2008/000619
§ 371 (c)(1),
(2), (4) Date: Jan. 20, 2009

(87) PCT Pub. No.: WO2008/151587
PCT Pub. Date: Dec. 18, 2008

(65) Prior Publication Data
US 2010/0085788 A1 Apr. 8, 2010

(30) Foreign Application Priority Data
Jun. 15, 2007 (DE) .................. 10 2007 028 077

(51) Int. Cl.
*H02M 3/335* (2006.01)
*H02M 5/45* (2006.01)
*H02M 7/5387* (2006.01)
(52) U.S. Cl. .............. 363/17; 363/37; 363/132

(58) Field of Classification Search ............ 363/16, 363/17, 34, 37, 97, 98, 131, 132
See application file for complete search history.

(56) References Cited

U.S. PATENT DOCUMENTS

| | | | |
|---|---|---|---|
| 5,400,235 A * | 3/1995 | Carroll | 363/17 |
| 5,977,753 A | 11/1999 | Edwards et al. | |
| 6,115,273 A * | 9/2000 | Geissler | 363/89 |
| 7,440,300 B2 * | 10/2008 | Konishi et al. | 363/132 |
| 7,616,467 B2 * | 11/2009 | Mallwitz | 363/132 |
| 2007/0047277 A1 | 3/2007 | Konishi et al. | |
| 2010/0254170 A1 * | 10/2010 | Wu et al. | 363/40 |

FOREIGN PATENT DOCUMENTS

| | | |
|---|---|---|
| DE | 196 42 522 | 4/1998 |
| DE | 19732218 | 3/1999 |
| DE | 102 21 592 | 12/2003 |
| DE | 102 25 020 | 12/2003 |
| DE | 102004030912 | 1/2006 |
| DE | 102004037446 | 6/2006 |
| DE | 102006033851 | 3/2007 |
| WO | 2007/073946 | 7/2007 |

* cited by examiner

*Primary Examiner* — Matthew Nguyen
(74) *Attorney, Agent, or Firm* — Eschweiler & Associates, LLC

(57) ABSTRACT

The device is for feeding electricity into a power grid (8) with a DC generator (1), a DC converter (2) and an inverter (3), and particularly to a DC converter (2) suited for the device. The DC converter (2) comprises a choking coil (15) having two windings (w1, w2) that are magnetically coupled and conductively connected to each other, two switches (S5, S6) and three diodes (D6, D7, D8), and is configured such that grounding of the direct current generator (1) at the negative output (5) thereof is possible and the power load of the switches (S5, S6) is kept small.

16 Claims, 6 Drawing Sheets

DEVICE FOR FEEDING ELECTRIC ENERGY INTO A POWER GRID AND DC CONVERTER FOR SUCH A DEVICE

The invention relates to a device of the type recited in the preamble of claim 1 and to a DC converter suited therefore.

Various types of inverters are used to feed electric energy generated with direct voltage generators such as photovoltaic or fuel cell plants into an AC power grid, in particular into the utility grid (50/60 Hz). Between the direct voltage generator and the inverter, there is mostly provided a DC converter (DC-DC converter), which serves the purpose of converting the direct voltage supplied by the direct voltage generator into a direct voltage needed by the inverter or adapted thereto.

It is desirable to ground one of the outputs of the direct voltage generator for different reasons and, within the frame of the present invention, such cases are particularly taken into consideration in which the ground connection is provided at the negative output of the direct voltage generator. The reason for the desired grounding is, on the one side, that such grounding is prescribed in some countries. On the other side, various disadvantages arise during operation when such grounding is missing. One problem among others are the high-frequency leakage currents. Due to unavoidable parasitic capacities between the direct voltage generator and the ground, considerable equalizing currents, which present an intolerable safety risk, may happen in the event of potential fluctuations, which make it necessary to provide for complex monitoring measures with the help of residual current sensors or the like for contact protection or for electromagnetic compatibility (EMC) and which can only be securely avoided through grounding. Potential fluctuations on the direct voltage generator may further lead to permanent destructions of certain solar modules such as thin film modules or the like.

Grounding as described is readily possible if DC converters with transformers are used, which cause galvanic separation between the direct voltage side and the alternating voltage side to happen. Irrespective of whether grid transformers or high-frequency transformers are being used, transformers however result, inter alia, in a reduction of efficiency, in parts considerable weights and sizes and/or in additional regulation expense, this being the reason why transformerless voltage converters are basically preferred. The usual topologies of transformerless DC converters however either make it impossible to achieve the desired grounding since this would result in a short-circuit in needed switches, capacities or the like, or in increased circuitry expense and other disadvantages.

Numerous attempts have been made to otherwise avoid the disadvantages mentioned. Circuits have in particular been known, which serve the purpose of reducing the undesired leakage currents (e.g. DE 10 2004 037 466 A1, DE 102 21 592 A1, DE 10 2004 030 912 B3). In these circuits, a solar generator e.g., is operated isolated from the grid in certain phases of internal electric energy transport. When the solar generator is then periodically electrically connected to the grid, its parasitic capacities are only slightly reloaded so that the potential of the solar generator at mains frequency changes sinusoidally and at a voltage amplitude that corresponds to half the grid voltage. Due to the small voltage differences of the solar generator, high-frequency currents then only form between two switching cycles and through asymmetries during switching. In this way, capacitive leakage currents can be strongly minimized but cannot be completely avoided in principle.

There is further known a switching arrangement (DE 102 25 020 A1) using a divided solar generator the center point of which is grounded. As a result, all the parts of the solar generator have a fix potential and capacitive leakage currents cannot flow in principle. Since the two direct current sources have different yields, a circuit is moreover provided to accommodate the power differences and the voltages. In this circuitry proposition, the disadvantages are the high voltage differences in the solar generator and at the switches, the additional loss in the compensation circuit and the fact that at least four switches, which are clocked at high frequency, are needed.

Besides, circuit arrangements have already been known by means of which a solar generator can be grounded on one side even if a transformer is missing. As a matter of principle, capacitive leakage currents are thus avoided. One of these circuit arrangements (DE 196 42 522 C1) however needs five active switches, one or two switches switching simultaneously at high frequency and having to provide the mean output current. On this circuit, which is also referred to as a "flying inductor", the efficiency is affected by the great number of component parts participating simultaneously in series in the current flow. The disadvantage of this circuit also is that discontinuous current pulses are impressed upon the grid, which require a capacitive grid filter which, as a matter of principle, worsens the power factor but also the efficiency of the circuit in part load range, due to its own need for idle power. Although such a capacitive grid filter can be avoided using another known circuit (DE 197 32 218 C1), nine active switches are needed therefor, two of which at least must be switched simultaneously at high frequencies so that the construction expense would be even further increased and both the robustness and the efficiency of the entire device negatively affected. The topology of a flying inductor further has the disadvantage that the voltage load of the switches depends on the mains voltage and is sensitive to mains power failures and can only be operated in the three-phase operation mode by being used three-fold with the help of three inverters. Irrespective thereof, inverters with current source characteristic are needed, which is undesirable in many cases.

Finally, apparatus of the type mentioned herein above are known (US 2007/0047277 A1) which are intended for inverters with a bipolar voltage intermediate circuit containing two capacitors mounted in series and connected together at a ground terminal. Such type inverters, which are mainly used nowadays for the purposes of interest herein, can be configured to be what are referred to as half-bridge inverters, half-bridge inverters in 3 point circuits and, at need, inverters for one-phase or three-phase mains electricity supply. In all of these cases, the connection point between the two capacitors forms a ground terminal that is associated with the zero or neutral conductor of the respective grid and is connected therewith.

The DC converter of this known device contains a storage reactor, two diodes and one switch. In this case, the ground terminal of the inverter can be connected to the negative output of the direct voltage generator. This is made possible by using a storage reactor that is composed of two magnetically coupled windings. The two windings of this storage reactor are galvanically connected together at one end in such a manner that on one side, when the switch is closed, one of the two windings is loaded by the direct voltage generator and the other winding through the first winding by virtue of the magnetic coupling and that, on the other side, when the switch is open, the two windings are unloaded through a respective one of the two capacitors, which is associated, and through an associated diode.

The advantage that this device makes it possible to ground the direct voltage generator with relatively simple means, in particular without transformer and with only one switch, is offset by the disadvantage that the switch, when open, is loaded with a voltage resulting from the sum of the output voltage of the direct voltage generator and of the voltage at one of the two capacitors of the voltage intermediate circuit of the inverter. Conversely, it follows therefrom that the output voltage of the direct voltage generator is at the most allowed to equal the difference between the admissible voltage at the switch and the voltage at the capacitor of concern if one wants to securely avoid destruction of the switch. Such type limitations for the output voltage of the direct voltage generator are undesirable. In order to keep the flowing currents and, as a result thereof, the loss, low, voltages are desired instead, which are much higher than the voltage difference mentioned so that one needs either complex, highly loadable switches or, if usual switches are being used, the output voltage at the direct voltage generator must be reduced. Devices of this type have therefore a limited range of application.

In view of said state of the art, the technical problem of the invention is to configure the device of the type mentioned herein above and in particular a DC converter suited therefor in such a manner that grounding of the negative terminal of the direct voltage generator can be realized not only with also relatively simple construction means but also with considerable reduction of the voltage load of the switch of the DC converter.

The solution to this problem is achieved, in accordance with the invention, with the characterizing features of the claims 1, 2 and 11.

The invention allows for grounded operation of the direct voltage generator by using a DC converter that merely needs, in the simplest case, a storage reactor, three diodes and two switches. As a result and in spite of only slightly increased expense, the advantage is achieved that the maximum load of one of the switches is not higher than the output voltage of the direct voltage generator whilst the voltage load at the other switch is not higher than the voltage of one of the capacitors so that the output voltage of the direct voltage generator can be increased up to the load limit of the switches, as contrasted with the generic device.

Further advantageous features of the invention will become apparent from the dependent claims.

The invention will be described in closer detail herein after with reference to the appended drawings and exemplary embodiments. In said drawings.

Figure 1:
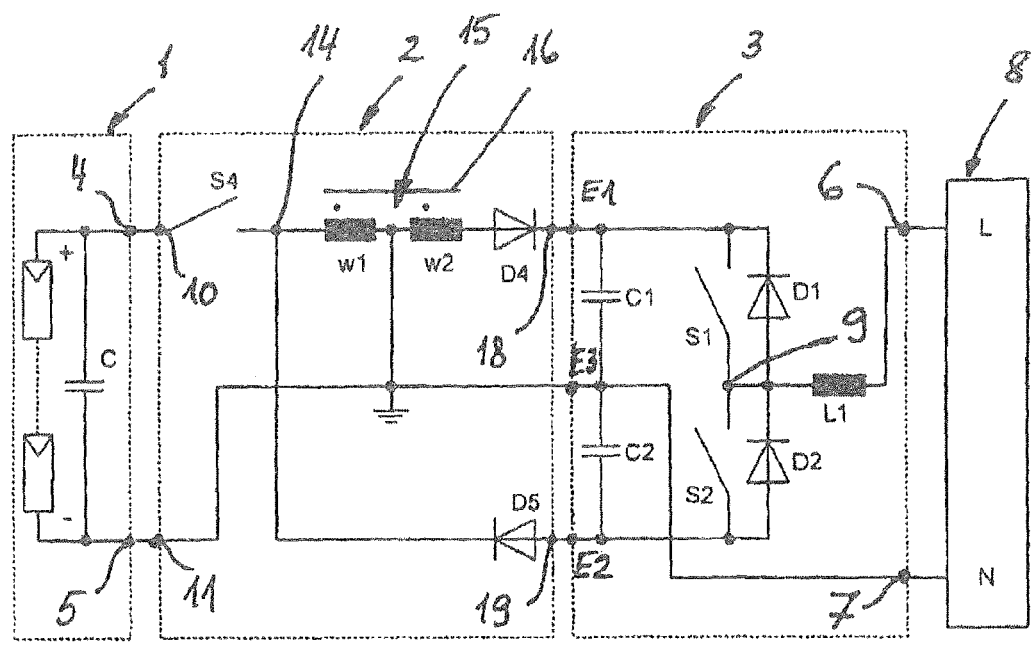
FIG. 1 shows the known structure of a device with a grounded direct voltage generator for feeding electric energy into a power grid.

According to FIG. 1, a usual device considered within the frame of the present invention contains a direct voltage generator 1, a DC converter 2 and an inverter 3. The direct voltage generator 1 consists e.g., of a photovoltaic or fuel cell plant and comprises a capacitor C connected in parallel with its two outputs 4 (+) and 5 (−) (e.g., US 2007/0047277A1, FIG. 10).

The inverter 3 of the known device comprises two outputs 6 and 7 which serve herein for one-phase feeding of electric energy into a power grid 8 the phase L of which is connected to the output 6 and the zero or neutral conductor N of which is connected to the output 7. The inverter 3 moreover contains three inputs E1, E2 and E3. Between the inputs E1 and E2 there are disposed two series-connected capacitors C1 and C2 the connecting point of which lies at the input E3. The capacitors C1 and C2 form a usual, bipolar voltage intermediate circuit of the inverter 3. According to FIG. 1, the inverter 3 is configured to be a half-bridge inverter and is provided for this purpose with two switches S1 and S2 the one terminal of which is connected to one of the inputs E1 or E2 and the other terminal of which leads to a common connection point 9 and from there, via a smoothing or line reactor L1, to the output 6. Moreover, one diode D1, D2 is respectively connected in parallel with each of the two switches S1, S2 and the diode D1 can be made conductive starting from the connection point 9 toward the input E1 and the diode D2 starting from the input E3 toward the connection point 9, both diodes locking in the opposite direction. Finally, the input E3 is directly connected to the output 7, is grounded on the other side and as a result thereof configured to be a ground terminal and is connected to the negative output 5 of the direct voltage generator 1.

The DC converter 2 has two inputs 10 and 11 to be connected to the output 4 and of the direct voltage generator 1. A switch S4 leading to a connection point 14 is connected to the input 10. The one terminal of a storage reactor 15 configured to be a coupled reactor is connected to this connection point 14. The storage reactor 15 contains a first winding W1 and a second winding W2, which are both magnetically coupled together and are e.g., wound about one common core 16 for this purpose. The two windings W1, W2 are joined together, forming another connection point 17.

The input E3 of the inverter 3, which is configured to be a ground terminal, is not only galvanically connected to the input 11 to be connected to the negative output 5 of the direct voltage generator 1, but is also galvanically connected to the connection point 17 of the two windings W1, W2 of the DC converter 2. Moreover, the other terminal of the winding W2 is connected to the input E1 through a diode D4 and the input E2 to the connection point 14 between the switch S4 and the winding W1 through another diode D5. As a result, a total of three electric circuits are formed. Starting from input 10 of the DC converter 3, one first electric circuit is formed from the switch S4, the winding W1 connected in series therewith and a line leading from the connection point 17 to the input 11. A second electric circuit contains the first winding W1 and leads from the connection point 14 through the first winding W1, the ground terminal E3, one capacitor C2 associated with the winding W1 and the diode D5, which are all mounted in series, back to the connection point 14. A third electric circuit finally contains the second winding W2 and leads from the connection point 17 through the winding W2 and the diode D4 to the input E1, from there through the other one of the two capacitors C1, which is associated with the winding W2, to the ground terminal E3 and from there back to the connection point 17 between the two windings W1 and W2.

The two windings W1, W2 are wound about the common core 16 for the winding W2 to be loaded by winding W1 when winding W1 is loaded by virtue of the magnetic coupling. The winding sense of the two windings W1, W2 is thereby chosen for the same voltage polarities to be obtained at terminals that are outlined by points in FIG. 2.

In a known way, the switches S1, S2 and S4 are practically configured to be semi-conductor switches that can be switched on and off periodically during operation using control units that have not been illustrated herein (microcontrollers, PWM controls, and so on), the switching frequency being e.g., 16 kHz or more.

The functioning of the device described is substantially as follows:

On the side of the direct voltage generator 1, the coupled storage reactor 15 is loaded with the help of the first electric circuit 10, S4, W1, 11 when the switch S4 is closed. When the switch S4 is open, the winding W1 can unload with C2 through the second electric circuit (via the path 14, W1, E1, C2, D5 and 14), whilst the winding W2 can unload with C1 through the third electric circuit (via the path 17, W2, D4, E1, C1, E3 and 17). For these functions, only one switch (S4), one coupled storage reactor (15) and two diodes (D4, D5) are needed so that the expense is quite low and the efficiency high. Moreover, as desired, the negative output 5 of the direct voltage generator 1 is grounded or adapted for grounding, this also applying for the neutral conductor N of the power grid 8. The voltage intermediate circuit here has three efficient terminals E1, E2 and E3 to which the direct voltage converter 2 is or can be connected to outputs 18, 19 or to the input 11 when it is made and/or sold as a separate circuit part.

On the side of the inverter 3, the switches S1, S2 are alternately switched on and off. As a result, e.g., during the positive half wave of the switching signal (switch S1 is at first closed, switch S2 open), the side of capacitor C1, which is positive with respect to E3, (input E1) is connected to phase L via the connection point 9 and the mains reactor L1. When the switch S1 then opens, the current can flow through the mains reactor L1, the capacitor C2 and the diode D2. During the negative half wave of the power grid 8, (switch S1 open, switch S2 at first closed), the negative side of the capacitor C2 with respect to E3 (input E2) is connected to phase L through the connection point 9 and the reactor L1, the flow being allowed to flow through the diode D1 and the capacitor C1 after the switch S2 has closed. The two capacitors C1, C2 are alternately unloaded and reloaded.

If the load is symmetrical and if W1 and W2 have the same number of turns, the voltages at C1 and C2 are equal. If in operation C1 e.g., is subjected by the inverter 3 on the mains side to higher load than C2, the charging current from W2 will automatically be higher than that from W1. As a result, the circuit gets symmetrical by itself, which is a basic prerequisite for operation of the inverter 3 on the mains side.

The configuration of the DC converter 2 described involves the advantage that the direct voltage generator 1 can be operated with a relatively large range of output voltages. If the DC converter 2 were missing, one would have to make certain that the direct voltage generator 1 supplies to the inputs E1 and E2, even under unfavourable circumstances, such a high output voltage that the capacitors C1 and C2 are loaded to a voltage that is higher than the mains amplitude (usually about ±325 V). If, by contrast, there is provided a boost converter 2, the voltages at the capacitors C1, C2 can be set to the desired level by choosing the duty factor at which the switch S4 is operated even if the output voltage of the direct voltage generator 1 is lower than the minimum voltage required by the inverter 3 (or by the power grid 8).

The device known insofar is also very flexible in utilization. This is due to the fact that the voltages at C1 and C2 can be both higher and lower than the input voltage at the capacitor C, depending on the duty factor chosen for S4. If the duty factor is more than 0.5, the converter is boosting. If the duty factor is less than 0.5, then the DC converter 2 bucks. A duty factor of 0.5 practically entails that the voltage applied to the output of the direct voltage generator 1 is fed directly. As a result, one obtains a large range of operating voltage with only one switch in the DC converter 2 in the event of a grounded direct voltage generator 1. The maximum voltage load of the inverter switches S1 and S2 is about 2·UC1, wherein UC1 is the maximum voltage at the capacitor C1. In the simplest case, only one of these switches can be switched at high frequency for each half mains period whilst the other one is kept switched off. Moreover, on the inverter side, a continuous current flow into the power grid 8 is possible.

A disadvantage of the device described is, as already explained herein above, that the switch S4 is loaded in the open condition with a voltage US4=UC+UC2, wherein UC and UC2 are the voltages at the capacitors C and C2. This disadvantage is avoided in accordance with the invention.

Figure 2:
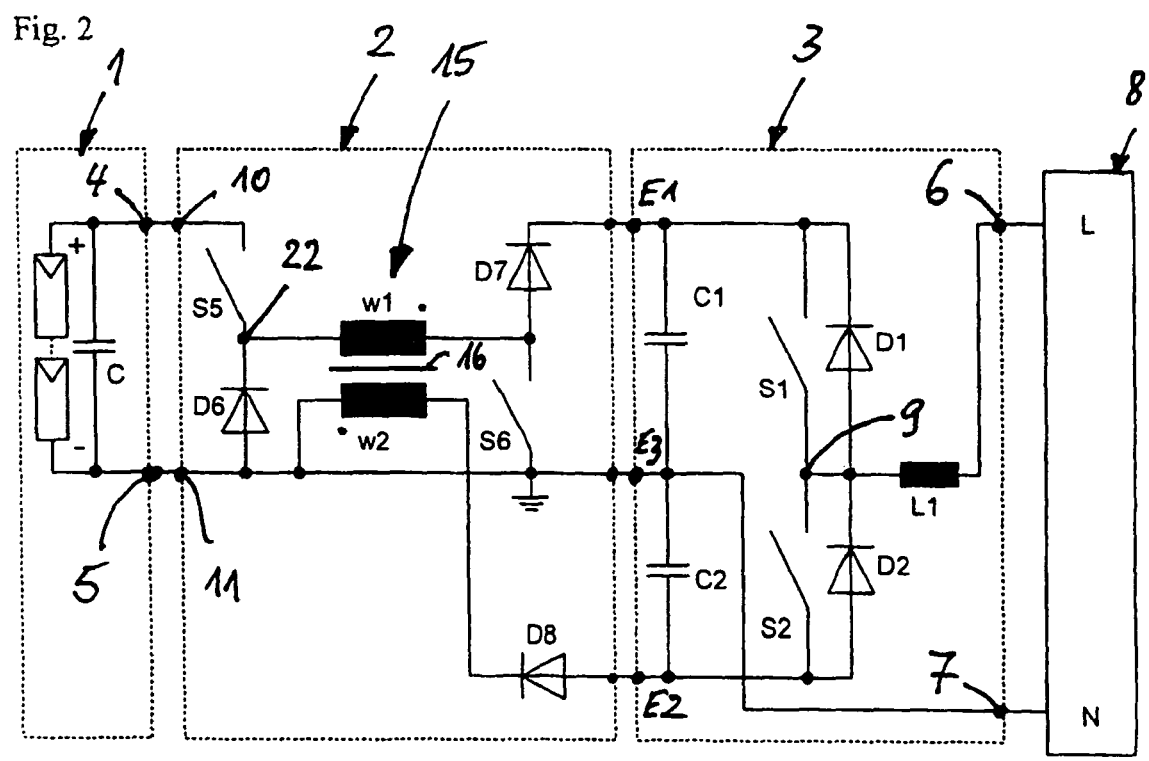
FIG. 2 shows a device of the invention with a grounded direct voltage generator for feeding electric energy into a power grid.

FIG. 2 shows a first exemplary embodiment of the device of the invention, in which the desired effects are achieved with the help of a coupled storage reactor 15 according to FIG. 1 as well as with two switches S5, S6 and three diodes D6, D7 and D8, i.e., that here again the switching expense is low. A first switch S5 is laid between the input 10 and a connection point 22 to which the one terminal of the winding W1 of the storage reactor 15 is connected. The other terminal of the winding W1 is connected, via a second connection point 23 and by means of a second switch S6, to the input E3 of the inverter 3, which is configured to be a ground terminal and which also serves for connection to the input 11 of the DC converter 2 or to the negative output 5 of the direct voltage generator 1. As a result, the current path starting from 10 via S5, 22, W1, 23, S6, 11 and back to 10 forms a first electric circuit.

Further, in accordance to FIG. 2, a first diode D6, which starts from the ground terminal E3, is laid through the connection point 22, the winding W1, the connection point 23, a second diode D7 and the capacitor C1 here associated with the winding W1 back to the ground terminal E3. As a result, a second electric circuit occurs in which the diodes D6, D7 can only be made conductive in the direction E1. Finally, a third electric circuit containing the second winding W2 is provided, which leads from the ground terminal E3, through the capacitor C2 here associated with the winding W2, a third diode D8 and the second winding W2 back to the ground terminal E3.

Figure 3:
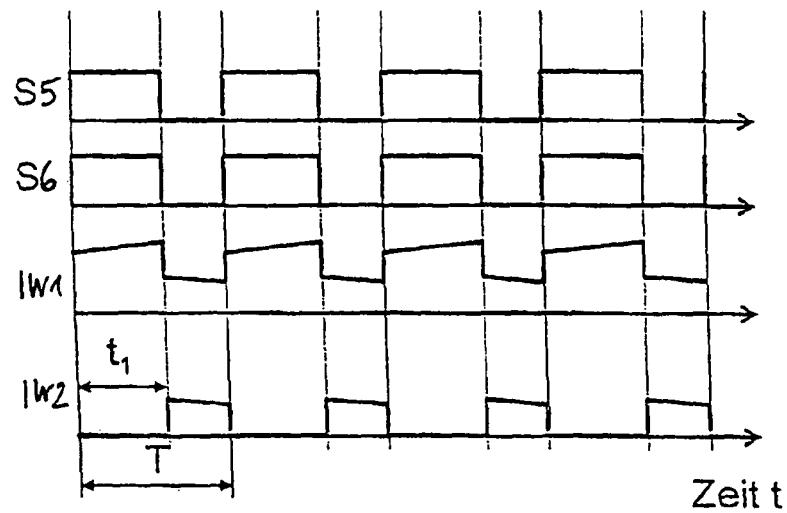
FIG. 3 shows the signals for controlling two switches of the apparatus shown in FIG. 2 and resulting current profiles.

The signals for actuating the switches S5 and S6 as well as the current profiles in the windings W1, W2 of the storage reactor 15 are apparent by way of example from FIG. 3. It can be seen therefrom that the two switches S5, S6 are always switched on and off concurrently. The functioning of the device shown in FIG. 2, which is for the rest configured like in FIG. 1, is therefore as follows:

When the switches S5 and S6 are switched on at the same time, the first electric circuit described closes so that the storage reactor 15 is loaded in the way described herein above. If by contrast the switches S5, S6 are in the opened condition, the winding W1 is unloaded via D6, W1, D7 and C1 on the one side and the winding W2 is unloaded via C2 and D8 on the other side. Like in FIG. 1, each of the two capacitors C1, C2 is loaded by an associated winding W1, W2.

With the device shown in FIG. 2, all of the above mentioned advantages are achieved like with the device shown in FIG. 1. What differs however, and is particularly advantageous though, is that the maximum voltage load at the switch S5 in the opened condition is given by the voltage UC at the capacitor C or by the output voltage of the direct voltage generator 1, whilst the maximum load of the switch S6 occurs at maximum voltage at C1.

For the rest, the device shown in FIG. 2 is flexible in the same way as the device shown in FIG. 1, because the voltages at C1 and C2 can be both higher and lower than the output voltage at the direct voltage generator 1 so that a high operating voltage range is achieved.

Figure 4:
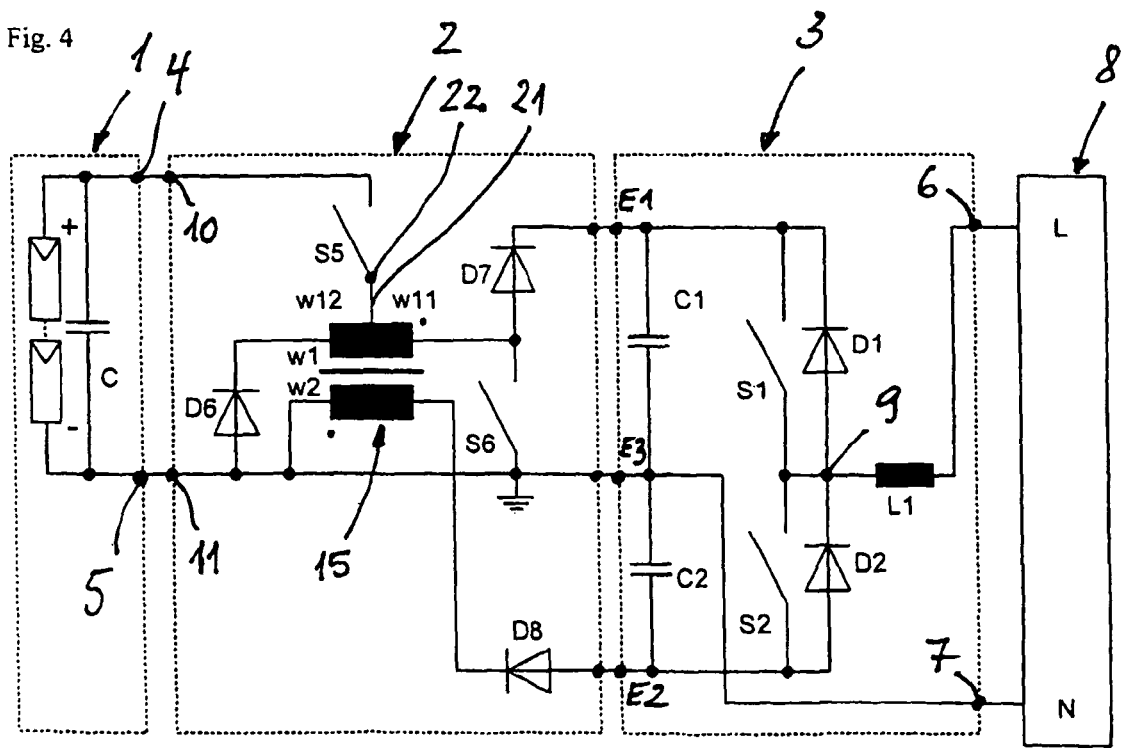
FIGS. 4 and 5 show a device as shown in FIG. 2, but each with a modified DC converter.

FIG. 4 shows an exemplary embodiment modified with respect to FIG. 2 in that the winding W1 is divided into two winding parts W11 and W12 (numbers of turns). In this case, the arrangement is made such that a central terminal or a winding tap 21 of the winding W1 is laid at a connection point 22 for connection with the first switch S5 and that part W11 of winding W1, which is fixed by this tapping 21, lies in the first electric circuit which serves for loading the storage reactor 20, whilst the second electric circuit contains the entire first winding W1 located between the diodes D6 and D7 or part W11+W12 thereof. As a result, in accordance with the invention, another optimization potential of the arrangement of the invention can be developed for the ratio of input voltage and output voltage, the load of the switch S5 and of the diodes D6, D7 and D8. If the transmission ratios are higher, it is also possible, beside the duty factor for S5 and S6, to influence the effective current and voltage load of the components through the ratio of W12: (W12+W11). In principle, the location of the tap 21 can be anywhere. A particular advantage of the tap 21 is that the maximum voltage load at the switch S5 in the opened condition is only given by the voltage US5=UC−[W12/(W12+W11)]·UC1 and is US6=UC1 at switch S6.

Figure 5:
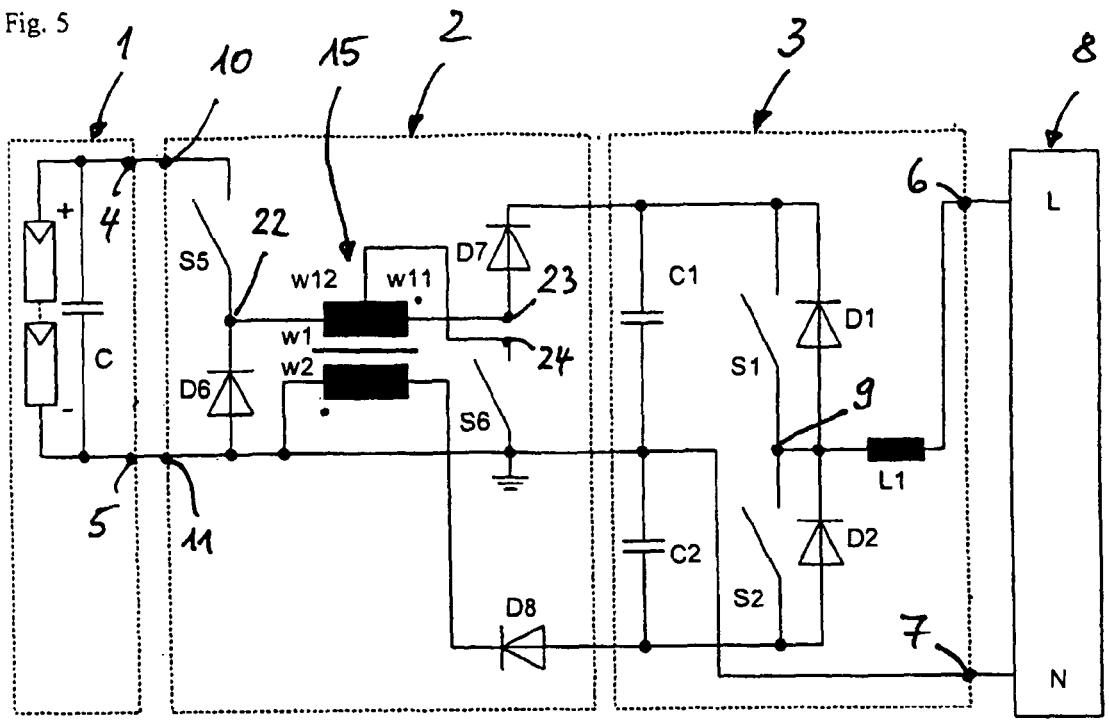

Alternatively, the tap 21 shown in FIG. 5 can be laid at a connection point 24 for connection to the second switch S6 whilst the part of the storage reactor formed from the parts W11 and W12 is laid between the connection points 22 and 23 like in FIG. 2. As a result, only part W12 of winding W1, which is fixed by the tap 21, is laid in the first electric circuit and is used during the loading cycles, whilst the entire winding W1 or part W11+W12 thereof lies in the second electric circuit and is operative during the unloading cycles. Here, the maximum load of switch S5 is US5=UC, the maximum load of switch S6, by contrast, US6=UC1−[W11/(W12+W11)]·UC1.

Figure 6:
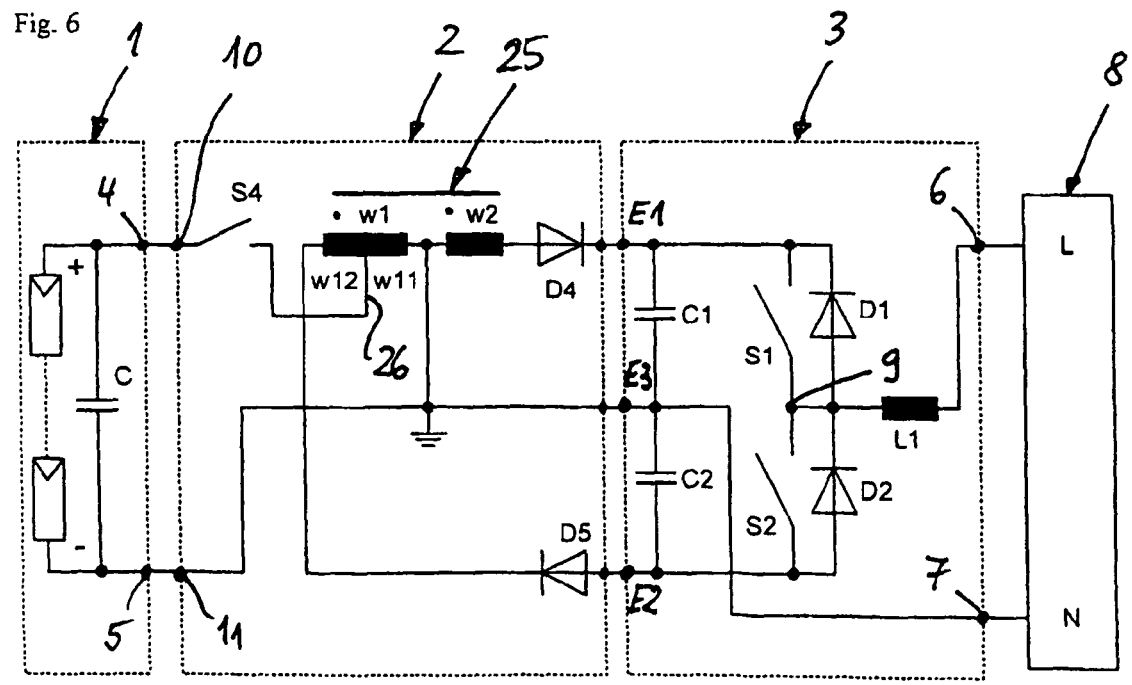
FIG. 6 shows a device as shown in FIG. 1, but with a modified DC converter.

FIG. 6 shows an exemplary embodiment that makes it possible to reduce the voltage load by dividing the first winding W1 of a storage reactor 25, even if a device according to FIG. 1 is used, which comprises only one switch S4. For this purpose, the first winding W1 of the coupled storage reactor 25 is divided into two parts W11 and W12 (=number of turns) by a winding tap 26. As contrasted to FIG. 1, the tap 26 is furthermore connected to the switch S4 at the connection point 14, whereas the normal input terminal of W1 is connected to the output of the diode D5 like in FIG. 1. As a result, only the part W11 of the first winding W1, which lies between the tap 26 and an output terminal, is in the first electric circuit (10, S4, 14, W11, 11) described herein above whilst the entire winding W1 or a part W11+W12 thereof lies in the second electric circuit with C2 and D5 like in FIG. 1. As a result, the maximum load of the switch S4 can be reduced to the value US4=[W11/(W11+W12)]·UC2+UC in accordance with the invention. In principle, the tap 26 can be located anywhere, like in FIGS. 4 and 5.

The functioning of the inverter 3 is substantially the same in all of the cases described herein above.

Figure 7:
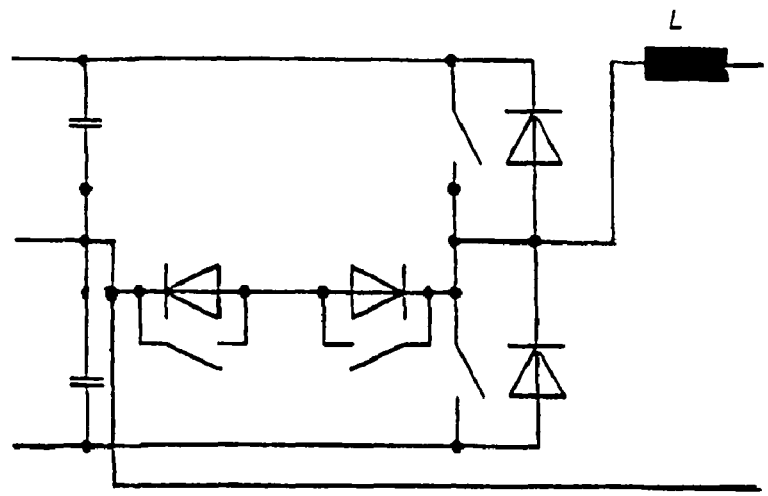
FIG. 7 through 9 show different types of inverters that may be operated with the DC converter as an alternative to the inverter shown in FIG. 1.
Figure 8:
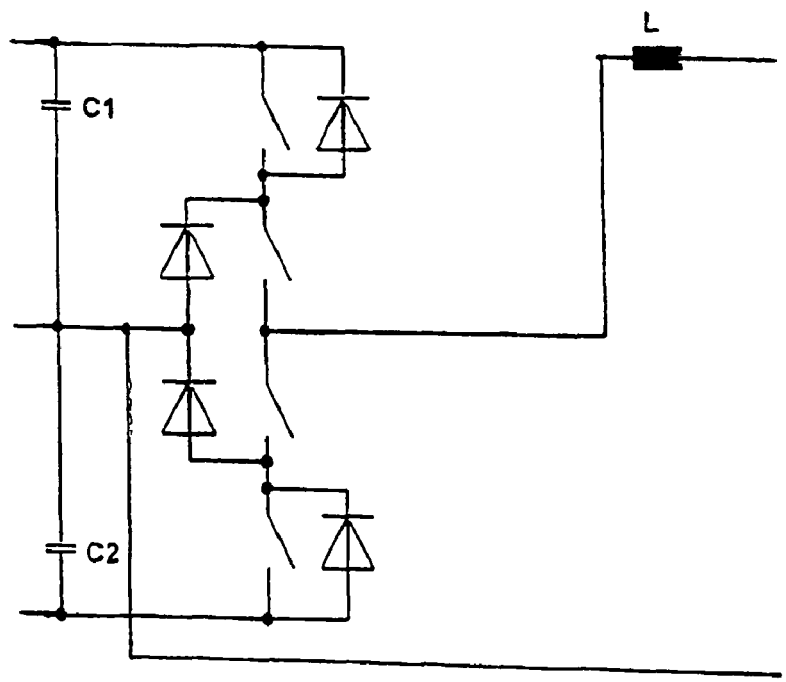
Figure 9:
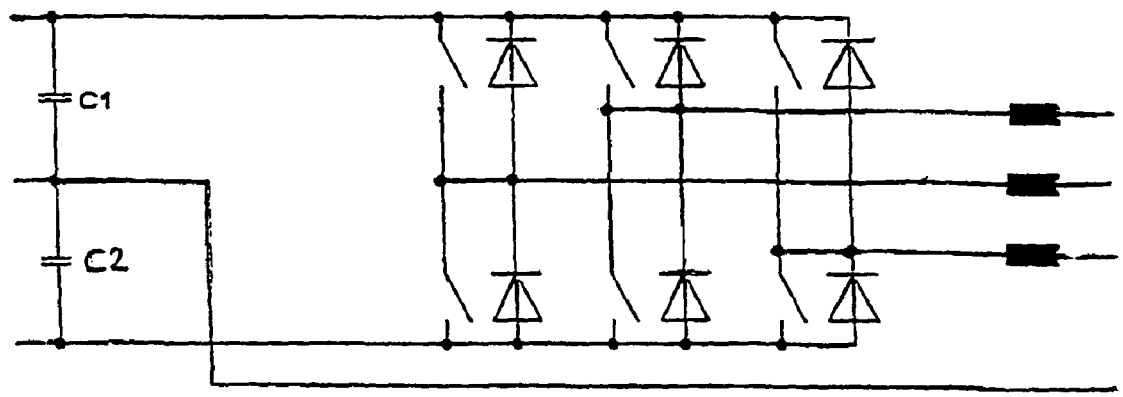

Although the description given herein above only refers to the inverter 3 configured to be a half bridge inverter, it is clear for those skilled in the art that other inverters with a bipolar voltage intermediate circuit can be connected to the DC converter 2 of the invention. This is schematically illustrated in FIG. 5 through 7. FIG. 5 shows a half bridge inverter in a 3-point circuit, FIG. 6 another inverter in a 3-point circuit with center point (each in a one-phase implementation) and FIG. 7 an inverter for 3-phase feeding into the power grid 8. All the three inverters have a bipolar voltage intermediate circuit, the inputs E1 through E3 and the outputs 6, 7 according to the description made herein above. Since such type inverters are known per se, it does not seem necessary to discuss them further.

The magnetic coupling of the windings W1 and W2 is preferably obtained by the fact that they are wound above or behind each other on a common core according to need. They preferably have the same number of turns and are, in the schematically illustrated arrangement shown in FIGS. 2 and 4, practically wound on the core 16 in opposite winding senses in order to obtain the right current directions during the loading and unloading processes.

The invention is not limited to the exemplary embodiments described, which can be varied in various ways. This applies in particular insofar as the inverters 3 and the DC converters 2 can be made and sold as separate component parts even if, as can be seen from the drawings, they are also preferably made and sold as one finished structural unit. Accordingly, the invention not only relates to the combination consisting of a DC converter 2 and an inverter 3 but also to the mere DC converter 2. It is further clear that in the description given herein above only those component parts have been described that are necessary to understand the invention and that in particular the required and known control members, MPP controllers and so on may be additionally provided. Moreover, it is understood that the various features may also be used in other combinations than those described and illustrated.

The invention claimed is:

1. A device for feeding electric energy into a power grid, containing a DC converter intended for connection to a direct voltage generator and an inverter connected thereto and intended for connection to the power grid, which contains a bipolar voltage intermediate circuit with two capacitors mounted in series, said capacitors being connected together at a ground terminal connected to a negative output of the direct voltage generator, said DC converter comprising at least two diodes, one switch and one storage reactor containing one first winding and one second winding, these two windings being magnetically coupled together in such a manner that, in a first switching condition, the first winding is loaded by the direct voltage generator and the second winding via the first winding by virtue of the magnetic coupling and that, in a second switching condition, the two windings are unloaded via a respective one of the two capacitors, which is associated, and via an associated diode, wherein a first terminal of the first winding is connected to a first connection point with a first switch and that a second terminal of the first winding is connected to a second switch at a second connection point in such a manner that the first winding forms, together with the two switches, a first electric circuit connected to associated outputs of the direct voltage generator and moreover lies in a second electric circuit that leads from the ground terminal through a first diode, the first connection point, the first winding, the second connection point, a second diode and the capacitor associated thereto back to the ground terminal and that the second winding is arranged in a third electric circuit that leads from the ground terminal, via the capacitor associated to said winding, via a third diode and the second winding back to the ground terminal.

2. The device as set forth in claim 1, wherein one of the windings is divided and is provided with a winding tap connected to one of the connection points in such a manner that only one part of the first winding, which is fixed by said tap, lies in the first electric circuit, while the first winding is arranged in the second electric circuit.

3. The device as set forth in claim 1, wherein the two windings are wound on a common core.

4. The device as set forth in claim 3, wherein the windings are wound on the core in opposing winding senses.

5. The device as set forth in claim 1 wherein the two windings have the same number of turns.

6. The device as set forth in claim 1, wherein the inverter is configured to be an inverter comprising a half bridge.

7. The device as set forth in claim 1, wherein the inverter is configured to be an inverter with a half bridge in a 3-point circuit.

8. The device as set forth in claim 1, wherein the inverter is configured to be an inverter with a half bridge in a 3-point circuit with center point.

9. The device as set forth in claim 1, wherein the inverter is configured for one-phase or three-phase feeding of the electric energy into the power grid.

10. A DC converter for a device for feeding electric energy into a power grid and for arrangement between a direct voltage generator and an inverter with a bipolar voltage intermediate circuit, wherein the DC converter comprises at least two diodes, one switch and one storage reactor containing one first winding and one second winding, these two windings being magnetically coupled together in such a manner that, in a first switching condition, the first winding is loaded by the direct voltage generator and the second winding via the first winding by virtue of the magnetic coupling and that, in a second switching condition, the two windings are unloaded via a respective one of the two capacitors, which is associated, and via an associated diode, wherein a first terminal of the first winding is connected to a first connection point with a first switch and that a second terminal of the first winding is connected to a second switch at a second connection point in such a manner that the first winding forms, together with the two switches, a first electric circuit connected to associated outputs of the direct voltage generator and moreover lies in a second electric circuit that leads from the ground terminal through a first diode, the first connection point, the first winding, the second connection point, a second diode and the capacitor associated thereto back to the ground terminal and that the second winding is arranged in a third electric circuit that leads from the ground terminal, via the capacitor associated to said winding, via a third diode and the second winding back to the ground terminal.

11. The DC converter as set forth in claim 10, wherein the DC converter is combined with the inverter to form one structural unit.

12. A device for feeding electric energy into a power grid, comprising:
a DC converter configured to receive energy from a direct voltage generator; and
an inverter coupled to the DC converter and configured to provide electric energy to the power grid, the inverter comprising:
a first capacitor and a second capacitor connected together in series at a ground node that forms a negative output terminal of the inverter and couples to a negative output of the DC converter; and
a half bridge circuit comprising first and second series-connected switches coupled in parallel with the first and second capacitors, wherein a connecting node between the first and second series-connected switches form a positive output terminal of the inverter,
wherein the DC converter further comprises:
a storage reactor comprising first and second windings that are magnetically coupled together;
first and second switches coupled to the storage reactor, wherein in a first switching condition the first and second switches are configured to load the first winding and thus the second winding via magnetic coupling via a first electric circuit, and in a second switching condition the first and second windings are unloaded to one of the first and second capacitors;
first and second diodes coupled to the storage reactor and configured to unload the first and second windings to one of the first and second capacitors via a second electric circuit, when the first and second switches are in the second switching condition;
a third diode configured to form a third electric circuit with the other of the first and second capacitors and the second winding.

13. The device of claim 12, wherein the first winding comprises a tap along a portion thereof, and wherein the first switch is coupled to the tap and is configured to close in the first switching condition, and open in the second switching condition.

14. The device of claim 13, wherein the second switch is coupled to a first end portion of the first winding, and wherein the second switch is configured to close in the first switching condition, and open in the second switching condition.

15. The device of claim 12, wherein the first winding has a tap associated therewith along a portion thereof, and wherein the second switch is coupled to the tap and is configured to close in the first switching condition, and open in the second switching condition.

16. The device of claim 15, wherein the first switch is coupled to a second, opposite end portion of the first winding, and wherein the first switch is configured to close in the first switching condition, and open in the second switching condition.

* * * * *